(12) United States Patent
Babu et al.

(10) Patent No.: US 10,001,505 B2
(45) Date of Patent: Jun. 19, 2018

(54) METHOD AND ELECTRONIC DEVICE FOR IMPROVING ACCURACY OF MEASUREMENT OF MOTION SENSOR

(71) Applicant: SAMSUNG ELECTRONICS CO., LTD., Suwon-si (KR)

(72) Inventors: Swarna Ravindra Babu, Chennai (IN); C Rakesh, Bangalore (IN); C Dhineshkumar, Bangalore (IN); Y Megha Swaroop, Bangalore (IN); Arun Kumar Siddanahalli Ninge Gowda, Bangalore (IN); Deepak Bhatt, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 166 days.

(21) Appl. No.: 15/062,831

(22) Filed: Mar. 7, 2016

(65) Prior Publication Data

US 2016/0258978 A1    Sep. 8, 2016

(30) Foreign Application Priority Data

Mar. 6, 2015 (IN) .......................... 1112/CHE/2015
Dec. 2, 2015 (IN) .......................... 1112/CHE/2015
Feb. 16, 2016 (KR) ........................ 10-2016-0017779

(51) Int. Cl.
- G01P 21/00 (2006.01)
- G01C 25/00 (2006.01)
- G01C 19/5776 (2012.01)

(52) U.S. Cl.
CPC .......... *G01P 21/00* (2013.01); *G01C 19/5776* (2013.01); *G01C 25/005* (2013.01)

(58) Field of Classification Search
CPC ........ G01P 21/00; G01P 15/125; G01P 15/18; G01P 15/08; G01C 25/005; G01C 25/00
USPC .......................................................... 73/1.38
See application file for complete search history.

(56) References Cited

U.S. PATENT DOCUMENTS

| | | | |
|---|---|---|---|
| 8,626,471 B2 | 1/2014 | Kennedy et al. | |
| 9,690,386 B2 * | 6/2017 | Ye | G06F 3/017 |
| 9,710,048 B2 * | 7/2017 | Zhao | G06F 1/3218 |
| 9,757,624 B2 * | 9/2017 | Binder | A63B 43/004 |
| 9,764,201 B2 * | 9/2017 | Binder | A63B 43/004 |
| 2006/0056487 A1 * | 3/2006 | Kuroda | G01K 1/165 |
| | | | 374/179 |
| 2009/0265671 A1 * | 10/2009 | Sachs | G06F 3/017 |
| | | | 715/863 |
| 2013/0082939 A1 * | 4/2013 | Zhao | G06F 1/3218 |
| | | | 345/173 |
| 2013/0162525 A1 * | 6/2013 | Ye | G06F 3/017 |
| | | | 345/156 |

(Continued)

*Primary Examiner* — Eric S McCall
*Assistant Examiner* — Mohammed E Keramet-Amircola
(74) *Attorney, Agent, or Firm* — Sughrue Mion, PLLC

(57) ABSTRACT

A method of improving accuracy of measurements of at least one motion sensor included in an electronic device, including receiving a candidate measurement associated with the electronic device from the at least one motion sensor; detecting an electronic device state associated with the electronic device, the electronic device state including one from among a static state and a motion state; computing a compensation parameter based on the candidate measurement and the electronic device state; and correcting the candidate measurement based on the computed compensation parameter.

18 Claims, 7 Drawing Sheets

(56) References Cited

U.S. PATENT DOCUMENTS

2013/0204813 A1 8/2013 Master et al.
2014/0320434 A1 10/2014 Pantel

\* cited by examiner

METHOD AND ELECTRONIC DEVICE FOR IMPROVING ACCURACY OF MEASUREMENT OF MOTION SENSOR

CROSS-REFERENCE TO RELATED APPLICATION

This application claims benefit from Indian Patent Provisional Application No. 1112/CHE/2015, filed on Mar. 6, 2015, and Indian Patent Application No. 1112/CHE/2015, filed on Dec. 2, 2015, in the Indian Intellectual Property Office, and claims benefit from Korean Patent Application No. 10-2016-0017779, filed on Feb. 16, 2016, in the Korean Intellectual Property Office, the disclosures of which are incorporated herein in their entireties by reference.

BACKGROUND

1. Field

The present disclosure generally relates to an electronic device, and more particularly, to a mechanism for improving accuracy of measurements of a motion sensor in the electronic device.

2. Description of Related Art

Accelerometers and gyroscopes are widely used today for a variety of motion sensing applications ranging from inertial navigation to vibration monitoring. Accelerometers measure changes in acceleration (linear) while gyroscopes provide information about angular motion (rotation). These devices use the inertial properties of light or matter for their operation and are broadly classified as 'inertial sensors'.

While these macroscopic accelerometers and gyroscopes are often used for inertial grade navigation systems, microscopic mechanical inertial sensors fabricated using MicroElectroMechanical Systems (MEMS) technology have been perceived as an advancement in the inertial navigation and motion sensing, due to a substantial reduction in cost, size and power that may be achieved in such MEMS sensors relative to their macroscopic counterparts. These attributes have enabled the use of such inertial sensors in a variety of applications due to their cost and size restrictions, for example, in various electronic devices such as mobile phones, Personal Digital Assistants, surgical instruments or the like.

In some conventional systems, the MEMS accelerometer and gyroscope sensors (inside the electronic devices) provide low quality measurements. The low quality measurements are obtained due to certain characteristics such as bias and drift associated with the accelerometer and the gyroscope. In other words, when the MEMS sensors are affected with bias and drift, the measurements from these sensors are degraded. Thus, there remains a need for improving the measurements of MEMS sensors.

SUMMARY

Exemplary embodiments herein may provide a mechanism for improving accuracy of measurements of one or more MicroElectroMechanical Systems (MEMS) sensors of an electronic device.

Exemplary embodiments herein may also provide a mechanism for receiving a candidate measurement associated with an object acquired by the one or more MEMS sensors.

Exemplary embodiments herein may further provide a mechanism for computing a compensation parameter. The compensation parameter may include one of bias, heuristic derived inferences, and machine learning derived inferences.

Exemplary embodiments herein may also provide a mechanism for correcting a candidate measurement by using a computed compensation parameter.

Exemplary embodiments herein may provide a mechanism for detecting an electronic device in one of a static state and a motion state.

Additional aspects will be set forth in part in the description which follows and, in part, will be apparent from the description, or may be learned by practice of the presented exemplary embodiments.

According to an aspect of an exemplary embodiment, a method of improving accuracy of measurements of at least one motion sensor included in an electronic device includes receiving a candidate measurement associated with the electronic device from the at least one motion sensor; detecting an electronic device state associated with the electronic device, the electronic device state including one from among a static state and a motion state; computing a compensation parameter based on the candidate measurement and the electronic device state; and correcting the candidate measurement based on the computed compensation parameter.

The compensation parameter may include at least one from among bias, heuristic derived inferences, and machine learning derived inferences.

The computing the compensation parameter may further include estimating the bias when the electronic device state is detected as the static state, and the correcting the candidate measurement may further include compensating the candidate measurement with the bias.

The computing the compensation parameter may further include computing orientation information from the candidate measurement received from the motion sensor when the electronic device state is detected as the motion state, and estimating the bias based on the orientation information, and the correcting the candidate measurement may further include compensating the candidate measurement with the estimated bias.

The computing the compensation parameter may further include identifying an odd number of zero crossings of the candidate measurement, the zero crossings being generated when the electronic device state is detected as the motion state, and estimating the bias based on an average of the candidate measurement, and the correcting the candidate measurement may further include compensating the candidate measurement with the estimated bias.

The computing the compensation parameter may further include estimating a delta change in an angle corresponding to an estimate of a heading of the electronic device due to a user motion when the electronic device state is detected as the motion state.

If the delta change is below a threshold value, the candidate measurement may be regarded as an effect of the bias and the estimate of the heading may be corrected by compensating the heading estimate with the delta change.

If the delta change is greater than a threshold value and below a shaping angle, the correcting the candidate measurement may further include compensating the candidate measurement with the shaping angle.

The computing the compensation parameter may further include clustering the candidate measurement into a cluster from among a plurality of clusters; and tagging the cluster as corresponding to a turn movement or a non-turn movement based on information of the candidate measurement, and the compensation parameter may be used to correct the candidate measurement if the cluster is tagged as corresponding to the turn movement.

According to another aspect of an exemplary embodiment, an electronic device for improving accuracy of measurements of at least one motion sensor includes a sensor configured to sense a candidate measurement associated with the electronic device through the at least one motion sensor; and a data processor configured to: receive the candidate measurement associated with the electronic device from the at least one motion sensor; detect an electronic device state associated with the electronic device, the electronic device state including one from among a static state and a motion state; compute a compensation parameter based on the candidate measurement and the electronic device state; and correct the candidate measurement based on the computed compensation parameter.

The compensation parameter may include one from among bias, heuristic based inferences, and machine learning based inferences.

The data processor may be configured to: identify an odd number of zero crossings of the candidate measurement, the zero crossings being generated when the electronic device state is detected as the motion state; estimate the bias based on an average of the candidate measurement; and correct the candidate measurement by compensating the candidate measurement with the estimated bias.

The data processor may be configured to estimate a delta change in an angle corresponding to an estimate of a heading of the electronic device due to a human motion when the electronic device state is detected as the motion state.

The data processor may be configured to: cluster the candidate measurement into a cluster from among a plurality of clusters; and tag the cluster as corresponding to a turn movement or a non-turn movement based on information of the candidate measurement, and the compensation parameter may used to correct the candidate measurement if the cluster is tagged as corresponding to the turn movement.

According to a further aspect of an exemplary embodiment, a method for correcting a measurement made by a motion sensor included in an electronic device includes receiving a plurality of motion measurements associated with the electronic device from the at least one motion sensor, the plurality of motion measurements including a candidate motion measurement; detecting a motion pattern associated with the plurality of motion measurements; computing a compensation parameter based on the detected motion pattern; and correcting the candidate motion measurement based on the computed compensation parameter.

The plurality of motion measurements may be associated with a motion history of the electronic device, and the candidate motion measurement may be associated with a current motion of the electronic device.

The motion pattern may correspond to at least one from among an orientation associated with the electronic device, a walking motion associated with a user of the electronic device, or an angle of a motion heading associated with the electronic device.

According to a still further aspect of an exemplary embodiment, a non-transitory computer readable recording medium may store computer executable program codes, which when executed by a processor, cause the processor to perform the methods above.

These and other aspects of the exemplary embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the exemplary embodiments herein without departing from the spirit thereof, and the exemplary embodiments herein include all such modifications.

BRIEF DESCRIPTION OF THE DRAWINGS

These and other aspects will become apparent and more readily appreciated from the following description of the exemplary embodiments, taken in conjunction with the accompanying drawings in which.

DETAILED DESCRIPTION

Figure 1:
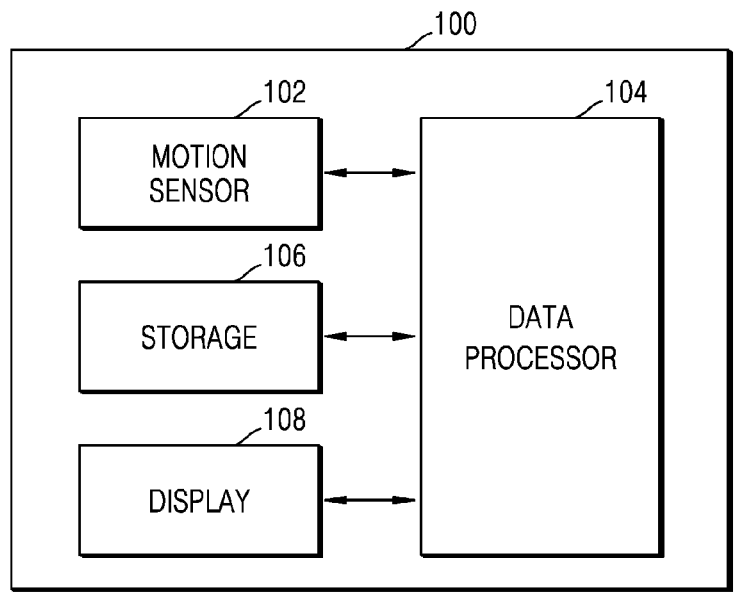
FIG. 1 illustrates an electronic device for improving accuracy of measurements of a motion sensor unit, according to an exemplary embodiment as disclosed herein.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

The exemplary embodiments herein and the various features and details thereof are explained more fully with reference to the non-limiting exemplary embodiments that are illustrated in the accompanying drawings and detailed in the following description. Descriptions of well-known components and processing techniques are omitted so as to not unnecessarily obscure the exemplary embodiments herein. Also, the various embodiments described herein are not necessarily mutually exclusive, as some exemplary embodiments can be combined with one or more other exemplary embodiments to form new exemplary embodiments. The term "or" as used herein, refers to a non-exclusive or, unless otherwise indicated. The examples used herein are intended merely to facilitate an understanding of ways in which the exemplary embodiments herein can be practiced and to further enable those skilled in the art to practice the exemplary embodiments herein. Accordingly, the examples should not be construed as limiting the scope of the exemplary embodiments herein.

The exemplary embodiments herein provide a method for improving measurements of Microelectromechanical systems (MEMS) sensor(s) of an electronic device. The method may include receiving a candidate measurement associated with an object acquired by the one or more MEMS sensors. Further, the method may include computing a compensation parameter. The compensation parameter may include one of bias, heuristic derived inferences, and machine learning derived inferences. Furthermore, the method may include correcting the candidate measurement by compensating with the computed compensation parameter.

In an exemplary embodiment, the method may include detecting whether the electronic device is in one of a static state and a motion state. Further, the method may include estimating the bias when the motion state is detected. The candidate measurement may be corrected by compensating with the bias.

In an exemplary embodiment, the method may include detecting whether the electronic device is in one of the static state and the motion state. The method may include computing orientation information (i.e., computer operation initial information) from a MEMS sensor(s) such as accelerometer or the like. When the motion state is detected, the method may include estimating the bias based on the orientation information. The candidate measurement may be corrected by compensating with the bias.

In an exemplary embodiment, the method may include detecting whether the electronic device is in one of the static state and the motion state. The method may include identifying odd number of zero crossings of the candidate measurement when the motion state is detected. The odd number of zero crossings may arise due to walking dynamics. Further, the method may include estimating the bias based on an average of the candidate measurement. The candidate measurement may be corrected by compensating with the bias.

In an exemplary embodiment, the method may include detecting whether the electronic device is in one of the static state and the motion state. Further, the method may include estimating a delta change in angle corresponding to the heading across the last two steps of human motion when the motion state is detected. When the estimated delta change is within a threshold, the candidate measurements within the delta angle computation time interval may be regarded as the effects of bias. Further, the method may include correcting a heading estimate by compensating with the delta change.

In an exemplary embodiment, when the estimated delta change is greater than the threshold and within a range of shaping angle, the output derived from candidate measurement may be corrected by compensating with the shaping angle.

In an exemplary embodiment, the method may include detecting whether the electronic device is in one of the static state and the motion state. The method may include clustering the candidate measurement into a plurality of clusters. Further, the method may include tagging each cluster as turn movement and non-turn movement based on information available in the candidate measurement. The candidate measurement may be corrected only for the turn movement.

Conventional MEMS accelerometer and gyroscope sensors inside the mobile may provide very low quality measurements. Therefore, for initialization and calibration, external systems such as magnetometer and GPS are required continuously. Drift characteristics of gyroscope are difficult to model which results in severe degradation of orientation information (roll, pitch and yaw). The scope of conventional applications using such sensors is primarily limited due to the poor quality of the sensors.

In an exemplary embodiment, the electronic device 100 can be used to improve the measurements of the MEMS sensor(s). The low quality measurements of the MEMS sensors are converted into high quality measurements. Various compensation parameters such as bias, heuristics derived inferences, machine learning derived inferences, or the like can be computed to convert the low quality sensor measurements into high quality measurements. Such derived high quality measurements can be used for sustained durations. In an exemplary embodiment, the electronic device 100 needs no external systems such as GPS, magnetometer, or the like for initialization which may decrease the overall system cost. Further, in an exemplary embodiment, the proposed method can be used for reducing battery power consumption of the electronic device as no external systems are utilized for calibration of the conventional MEMS sensors. Furthermore, in an exemplary embodiment, the electronic device 100 and method can be used in various applications such as, for example, but not limited to, gesture recognition, motion based controls, activity logging through smart phones and wearable devices, cell phone tracker, or the like. In an exemplary embodiment, the electronic device 100 and method can be used to expand the scope of such applications using the conventional MEMS sensors.

Further, in an exemplary embodiment, the electronic device 100 and method can be used in various image capturing applications. For example, an image capturing application can create a 3D image of an object by capturing the images in a 360 degree fashion and performing a stitching operation. The stitched images can thus be visualized by changing the orientation of a mobile phone or touch options. In such image capturing applications, unlike some conventional systems and methods, the proposed method can be used to perform periodic update of gyroscope derived estimates (roll and pitch) with the accelerometer measurements to minimize the effect of drift from the gyroscope. In an exemplary embodiment, real-time stationary detection can be performed using sensor measurements to estimate the drifting sensor bias values, which can provide an accurate estimate of the latest value of sensor bias. Further, unlike some conventional methods, any estimated angle changes at the occurrence of footfall detection can be discarded, thereby reducing the human walking or steps induced artifacts in the attitude estimates for such image capturing applications, In another example, the proposed method can be used to provide a virtual viewing experience of indoor or outdoor environments to a user. In some exemplary embodiments, a virtual view is generated by stitching the images taken at a predefined number of steps with the current heading of the user. In order to generate such virtual view, unlike some conventional systems and methods, a real-time motion state of the electronic device (static state and motion state) can be determined and bias can be estimated based on the state of the device. The bias is compensated by correcting the measurement obtained from the MEMS sensors. Step to step heading changes (if, for example, a delta change in angle is less than a threshold) are discarded to minimize effect of drift in original sensor measurement or walking dynamics of the user.

In an exemplary embodiment, the attitude estimates are reinitialized whenever the user is in a stationary mode which can be identified either from the use case scenario or specific requirements. In an exemplary embodiment, the electronic device 100 and method enables better usage of application or requirements induced constraints (such as the images will be taken only when the user is stationary) to mitigate the drifts in attitude estimates resulting from the integration of gyroscope values corrupted with bias, further helping in sustaining the sensor derived estimates for extended time durations.

In yet another example, PDR (Pedestrian Dead Reckoning) applications propagate location information to users from the last known reference positional information through the use of inertial sensors. The PDR applications may include a technology of calculating relative position from a start point by determining user's speed, direction and distance by using various sensors. Unlike some conventional systems and methods, in order to determine a user's current position accurately, the electronic device 100 includes estimating a periodicity (synchronous to step occurrence) in candidate sensor measurements. Attitude change in these intervals can be used to differentiate walking along straight line or a curved trajectory. Further the attitude estimates are reshaped with values that are defined by walking environment based constraints such as indoor office area where the walking paths will be predominantly along straight lines or 90 degree turns. Unlike some conventional methods, the electronic device 100 effectively utilizes environment based constraints to improve the quality of attitude estimates. The user walking behavior is determined in order to identify whether the user is walking along a straight line or taking turns, such as to reduce the time varying effect of the sensor biases. Unlike some conventional methods where the user's heading information is continuously tracked, the proposed method can be used to estimate the heading information only, for example, when the user changes heading direction.

The change in heading information is detected using self-learning schemes such as clustering. Examples of such schemes may include unsupervised classification scheme, signal decomposition scheme, or the like to determine time varying compensation characteristics of the sensor. Having such compensation characteristic information a priori, the candidate sensor measurement can be compensated to achieve high quality measurements. Such derived high quality measurements can be used for sustained durations.

Referring now to the drawings and more particularly to FIGS. 1 through 8 where similar reference characters denote corresponding features consistently throughout the figures, there are shown exemplary embodiments.

FIG. 1 illustrates an electronic device for improving measurements of a motion sensor, according to an exemplary embodiment as disclosed herein. In an exemplary embodiment, the electronic device 100 includes a motion sensor 102, a data processor 104, a storage 106 and a display 108.

In an exemplary embodiment, the motion sensor 102 includes one or more MEMS sensors. For example, the MEMS sensors include an accelerometer, a gyroscope, or any other inertial sensor, but are not limited thereto.

In an exemplary embodiment, the motion sensor 102 can be configured to obtain candidate measurements of the electronic device 100. The candidate measurements may include initial measurements regarding rotation, movement, etc., of the electronic device detected via the motion sensor 102. The MEMS sensors may acquire candidate measurements of the electronic device 100. The MEMS sensors, more particularly, the accelerometer and gyroscope sensors inside the electronic device 100 may provide low quality measurements. Therefore, for initialization and calibration, external systems such as magnetometer and GPS may be required continuously.

The accelerometer may refer to a device for measuring a linear acceleration or angular acceleration by measuring the reaction by inertia. For example, when a device including a combination of a mass and a spring attached to a case receives acceleration as a whole, the relative positions of the mass with respect to the case are changed. The accelerometer can obtain or determine non-gravitational acceleration in such a change or displacement. The accelerometer can measure the linear acceleration and angular acceleration of the electronic device 100.

The gyroscope may refer to a device that allows a rotating body that can be rotated at a high speed to freely rotate around three axes that include a rotor axis of the rotating body, and a horizontal axis and a vertical axis perpendicular to the rotor axis. Rotation of the electronic device 100 can be detected by using the gyroscope.

Unlike some conventional systems, prior to further processing, the data processor 104 can be configured to receive the candidate measurements in order to convert the low quality measurements into high quality tactical measurements. The data processor 104 can be configured to perform one or more actions for improving the measurements of the MEMS sensor(s). The data processor 104 can be configured to compute the compensation parameter such as bias, heuristics derived inferences, machine learning derived inferences, or the like can be computed to convert the low quality sensor measurements into high quality measurements. The data processor 104 can include various self-learning schemes to determine the compensation parameters from the sensors own trajectory. Further, the data processor 104 can be configured to correct the candidate measurement by compensating with the computed compensation parameter. Having such compensation characteristic information a priori, the data processor 104 can be configured to achieve high quality measurements by compensating the candidate sensor measurement with the compensation parameters. Such derived high quality measurements can be used for sustained durations.

In an exemplary embodiment, no external systems such as GPS, magnetometer, or the like are needed for initialization and calibration. Thus, the proposed system and method can assist the MEMS sensors to derive high quality tactical sensors without using any external instrumentation, thereby improving overall system performance and decreasing the overall system cost. Further, various operations performed by the data processor 104 are described in detail in conjunction with the FIG. 2.

In an exemplary embodiment, the data processor 104 may receive a candidate measurement to convert a low quality measurement into a high quality measurement. The data processor 104 may perform one or more operations in order to improve the measurements of the MEMS sensors. The data processor 104 can calculate a compensation parameter such as bias, heuristic derived inferences, or machine learning derived inferences, in order to convert a low quality measurement into a high quality measurement.

The data processor 104 can include various self-learning schemes to determine the compensation parameters from the sensors own trajectory. Further, the data processor 104 can be configured to correct the candidate measurement by compensating with the computed compensation parameter. Having such compensation characteristic information a priori, the data processor 104 can be configured to achieve high quality measurements by compensating the candidate sensor measurement with the compensation parameters. Such derived high quality measurements can be used for sustained durations.

In an exemplary embodiment, the storage 106 can be configured to store the candidate measurement obtained from the MEMS sensor(s). The storage 106 may include one or more computer-readable storage media. The storage 106 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage 106 may, in some examples, be considered a non-transitory storage medium. The term "non-transitory" may indicate that the storage medium is not embodied in a carrier wave or a propagated signal. However, the term "non-transitory" should not be interpreted that the storage 106 is non-movable. In some examples, the storage 106 can be configured to store larger amounts of information than the memory. In certain examples, a non-transitory storage medium may store data that can, over time, change (e.g., in Random Access Memory (RAM) or cache).

In an exemplary embodiment, the display 108 can be configured to display one or more sensor based applications after correction of the candidate measurement of the MEMS sensors. The one or more applications may include image processing applications, navigation applications, motion sensing applications or the like.

FIG. 1 shows an overview of the electronic device 100 but, it is to be understood that other exemplary embodiments are not limited thereto. The labels or names of the units are used only for illustrative purpose and does not limit the scope of the exemplary embodiments. Further, the electronic device 100 can include any number of units or sub-units communicating among each other along with the other components. Likewise, the functionalities of each unit can be combined by a single unit or can be distributed among each other in a manner different than described herein without departing from the scope of the exemplary embodiments.

Figure 2:
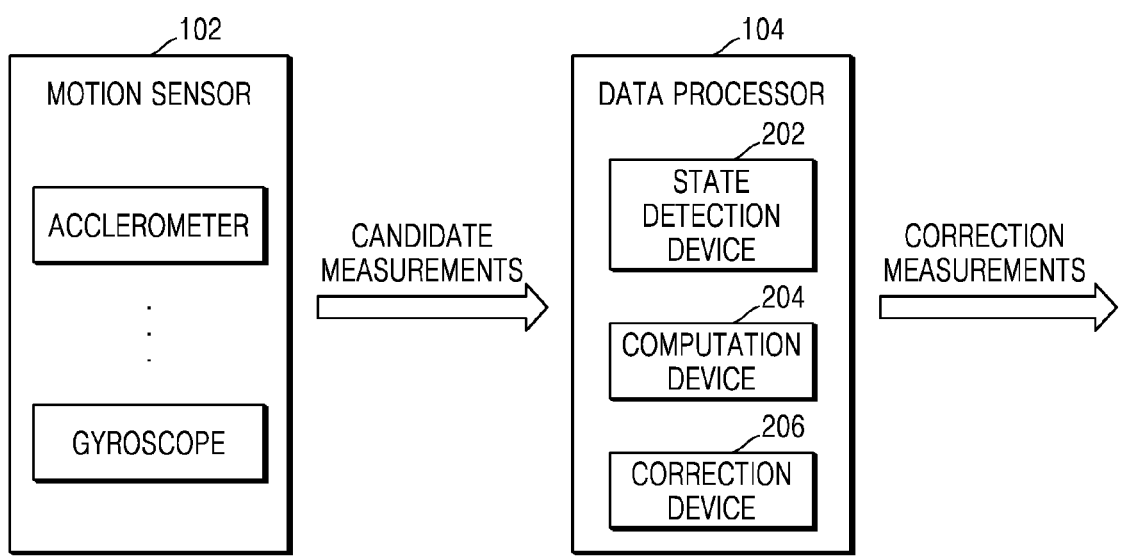
FIG. 2 illustrates various components of a data processor for improving accuracy of measurements of a motion sensor unit, for example, having an accelerometer and a gyroscope, according to an exemplary embodiment as disclosed herein.

FIG. 2 illustrates various units of the data processor 104 for improving measurements of the MEMS sensor(s), according to an exemplary embodiment as disclosed herein. In an exemplary embodiment, the data processor 104 includes a state detection device 202, a computation device 204 and a correction device 206.

In an exemplary embodiment, the state detection device 202 can be configured to detect the state of the electronic device 100. The state detection device 202 can be configured to detect whether the electronic device 100 is in the static state or the motion state.

In an exemplary embodiment, the computation device 204 can be configured to compute the compensation parameter. The compensation parameter can include at least one of the bias, the heuristics derived inferences and the machine learning derived inferences.

In an exemplary embodiment, the correction device 206 can be configured to correct the candidate measurement by compensating with the compensation parameter such as the bias, heuristic derived inferences and the machine learning derived inferences.

In an exemplary embodiment, the data processor 104 receives the low quality candidate measurement from the motion sensor 102, and corrects the candidate measurement according to the computed compensation parameter, to thereby output a corrected measurement. The corrected measurement has a higher quality in comparison with the candidate measurement in which accuracy of the corrected measurement has been enhanced.

FIG. 2 shows an overview of the data processor 104, but it is to be understood that other exemplary embodiments are not limited thereto. The labels or names of the units are used only for illustrative purpose and does not limit the scope of the exemplary embodiments. Further, the data processor 104 can include any number of units or sub-units communicating among each other along with the other components. Likewise, the functionalities of each unit can be combined by a single unit or can be distributed among each other in a manner different than described herein without departing from the scope of the exemplary embodiments.

Figure 3:
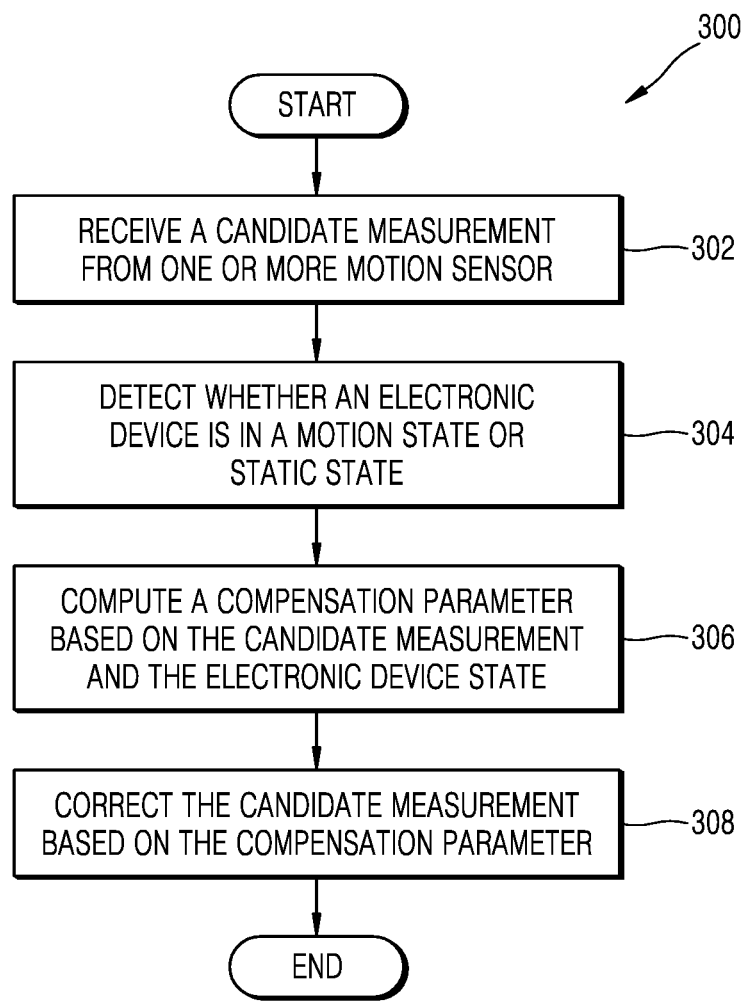
FIG. 3 is a flow chart illustrating a method of improving measurements of a motion sensor unit, according to an exemplary embodiment as disclosed herein.

FIG. 3 is a flow chart illustrating a method 300 for improving measurements of motion sensors, according to an exemplary embodiment as disclosed herein.

In an exemplary embodiment, at step 302, the electronic device 100 receives a candidate measurement from at least one motion sensor. The electronic device 100 allows the data processor 104 to receive the candidate measurement acquired by the at least one motion sensor. In an exemplary embodiment, the motion sensor may be a MEMS sensor. For example, the motion sensor includes at least one of an accelerometer and a gyroscope. The candidate measurement includes values of the initial measurements obtained from the motion sensor. The initial measurements may be of low quality.

At step 304, the electronic device 100 may detect a state of the electronic device 100, for example whether the electronic device 100 is in a motion state or a static state. At step 306, the electronic device 100 computes the compensation parameter based on the received candidate measurement and the electronic device state. The electronic device 100 allows the data processor 104 to compute the compensation parameter. The compensation parameter includes at least one of bias, heuristics derived inferences and machine learning derived inferences. Each compensation parameter may be computed independently for correcting the candidate measurement. Some exemplary embodiments of various steps involved in computing each compensation parameter is explained conjunction with the FIGS. 4 through 7.

At step 308, the electronic device 100 corrects the candidate measurement by compensating with the computed compensation parameter. The electronic device 100 allows the data processor 104 to correct the candidate measurement by compensating with the computed compensation parameter. The candidate measurement is corrected with the computed compensation parameter for improving the measurements of the MEMS sensor(s).

The various actions, acts, blocks, steps, or the like in the method 300 may be performed in the order presented, in a different order or simultaneously. Further, in some exemplary embodiments, some of the actions, acts, blocks, steps, or the like may be omitted, added, modified, skipped, or the like without departing from the scope of the exemplary embodiments.

Figure 4:
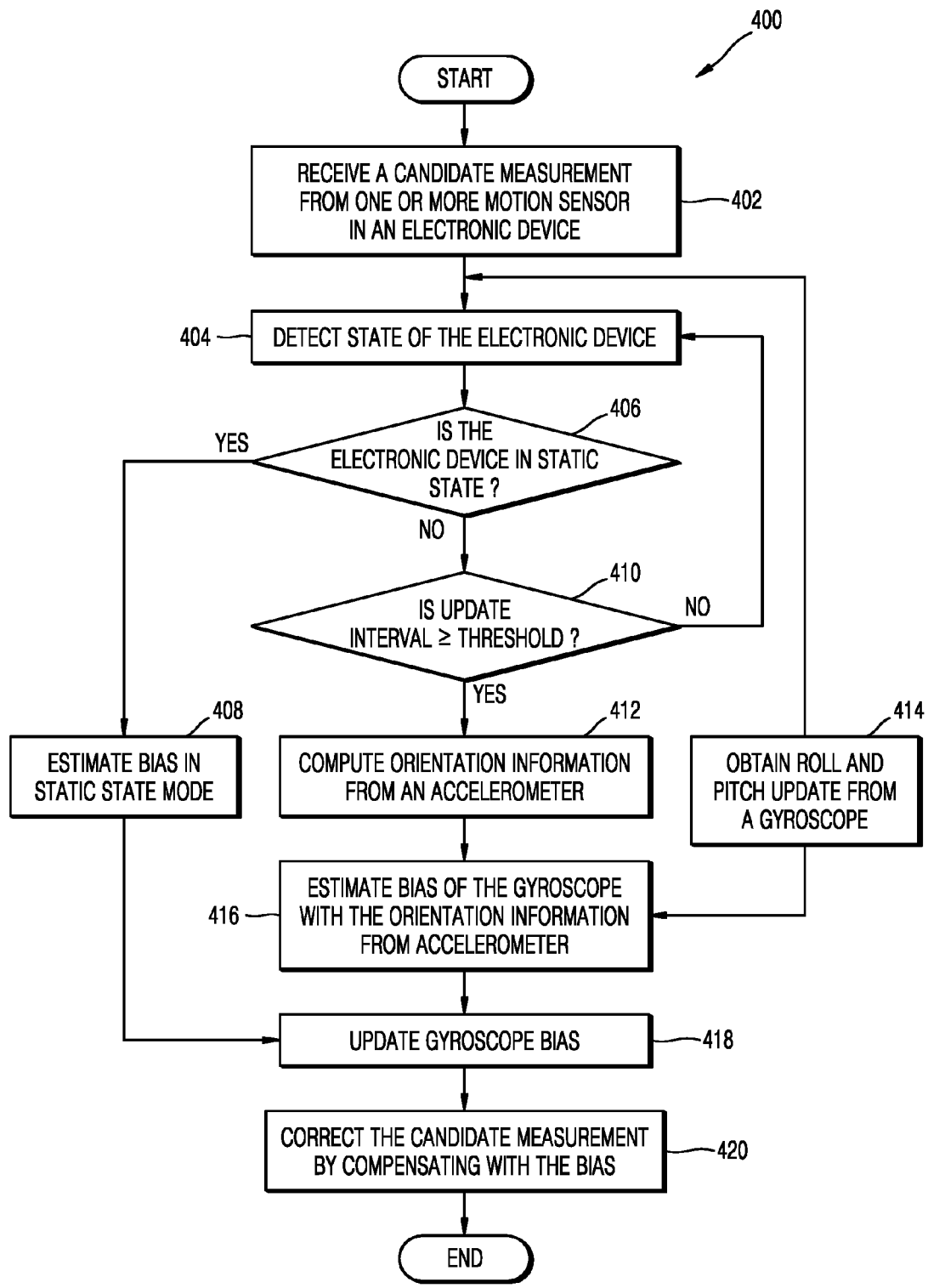
FIG. 4 is a flow chart illustrating a method of computing bias of a motion sensor unit, according to an exemplary embodiment as disclosed herein.

FIG. 4 is a flow chart illustrating a method 400 of computing bias of motion sensors, according to the exemplary embodiments as disclosed herein. In an exemplary embodiment, at step 402, the electronic device 100 receives a candidate measurement from at least one motion sensor.

The electronic device 100 allows the data processor 104 to receive the candidate measurement from the at least one motion sensor. Here, the motion sensors may include MEMS sensors. The candidate measurement includes values of the initial measurements (i.e., raw values) obtained from the MEMS sensors.

At step 404, the electronic device 100 detects the state of the electronic device 100. The electronic device 100 allows the data processor 104 to detect the state of the electronic device 100 in real time. The accelerometer detects the motion state of the electronic device 100 and the gyroscope detects the angular motion of the electronic device 100.

At step 406, the electronic device 100 determines whether the electronic device 100 is in the static state. The electronic device 100 allows the data processor 104 to determine whether the electronic device 100 is in the static state. If the electronic device 100 is in static state then, at step 408, the electronic device 100 estimates bias in the static state. The electronic device 100 allows the data processor 104 to estimate the bias in the static state. For example, bias in the static state can be estimated by averaging the candidate measurements (roll and pitch measurements) acquired by the gyroscope.

After estimating the bias in static state, at step 418, the electronic device 100 updates the gyroscope bias. The electronic device 100 allows the data processor 104 to update the gyroscope bias. It should be noted that, the measured static bias may be used either to update or correct the gyroscope bias.

If it is determined that the electronic device 100 is in motion state at step 406 then, at step 410, the electronic device 100 determines whether an update interval is greater than or equal to threshold. The electronic device 100 allows the data processor 104 to determine whether the update interval is greater than or equal to threshold. In an exemplary embodiment, the update interval is periodically incremented for each sample of the measurements from the accelerometer. For example, if the measurements from the accelerometer are obtained at every ten milliseconds and the threshold value is considered as one second then, after obtaining hundred measurements the update interval will be greater than or equal to the threshold.

If the update interval is greater than or equal to the threshold at step 410 then, at step 412, the electronic device 100 computes orientation information from the accelerometer. The electronic device 100 allows the data processor 104 to compute the orientation information from the accelerometer. When the update interval is greater than or equal to the threshold, then the orientation information such as roll and pitch are computed from the accelerometer. In an exemplary embodiment, the roll and pitch are computed from the accelerometer periodically. For example, at every second, the orientation information (i.e., roll and pitch) are computed from the accelerometer.

At step 414, the electronic device 100 obtains roll and pitch updates derived from the gyroscope. The electronic device 100 allows the data processor 104 to obtain the roll and pitch update from the gyroscope measurements. The roll and pitch are derived from the gyroscope. For example, when the user is moving around the object for capturing the images of the object at various angles, the gyroscope may provide the rate of angular movement of the user across the object. The roll and pitch measurements may be continuously derived from the gyroscope to determine the angular movement of the user. It should be noted that the roll and pitch measurements obtained from the gyroscope include the bias. In order to correct the bias, the roll and pitch measurements from the accelerometer may be obtained at periodic intervals to compensate the bias in the measurements of the gyroscope. In an exemplary embodiment, the roll and pitch measurements from the accelerometer are considered as reference while compensating the bias in the gyroscope.

At step 416, the electronic device 100 estimates bias of the gyroscope with the orientation information from the accelerometer. The electronic device 100 allows the data processor 104 to estimate the bias of gyroscope with the orientation information from the accelerometer. When the orientation information (roll and pitch) is obtained at periodic intervals and the roll and pitch measurements are obtained from the gyroscope, the bias in the gyroscope can be estimated using the below equations (1) and (2).

$$\text{GyroBiasRollAxis} = (G\_Roll - A\_Roll)/\text{Update Interval} \quad (1)$$

$$\text{GyroBiasPitchAxis} = (G\_Pitch - A\_Pitch)/\text{Update Interval} \quad (2)$$

where, G_Roll and G_Pitch denote the gyroscope derived roll and pitch estimates, and A_Roll and A_Pitch denote the accelerometer derived roll and pitch estimates.

At step 418, the electronic device 100 updates the gyroscope bias. The electronic device 100 allows the data processor 104 to update the gyroscope bias. As an example, in the above equations (1) and (2), if the update interval is considered as one second then for each second the gyroscope bias is estimated.

At step 420, the electronic device 100 corrects the candidate measurement by compensating with the bias. The electronic device 100 allows the data processor 104 to correct the candidate measurement by compensating with the bias. The candidate measurement (i.e., the roll and pitch) obtained from the gyroscope is corrected by compensating with the bias. In an exemplary embodiment, the roll and pitch measurements from the accelerometer are considered as reference while compensating the bias in the gyroscope.

The various actions, acts, blocks, steps, or the like in the method 400 may be performed in the order presented, in a different order or simultaneously. Further, in some exemplary embodiments, some of the actions, acts, blocks, steps, or the like may be omitted, added, modified, skipped, or the like without departing from the scope of the exemplary embodiments.

Figure 5:
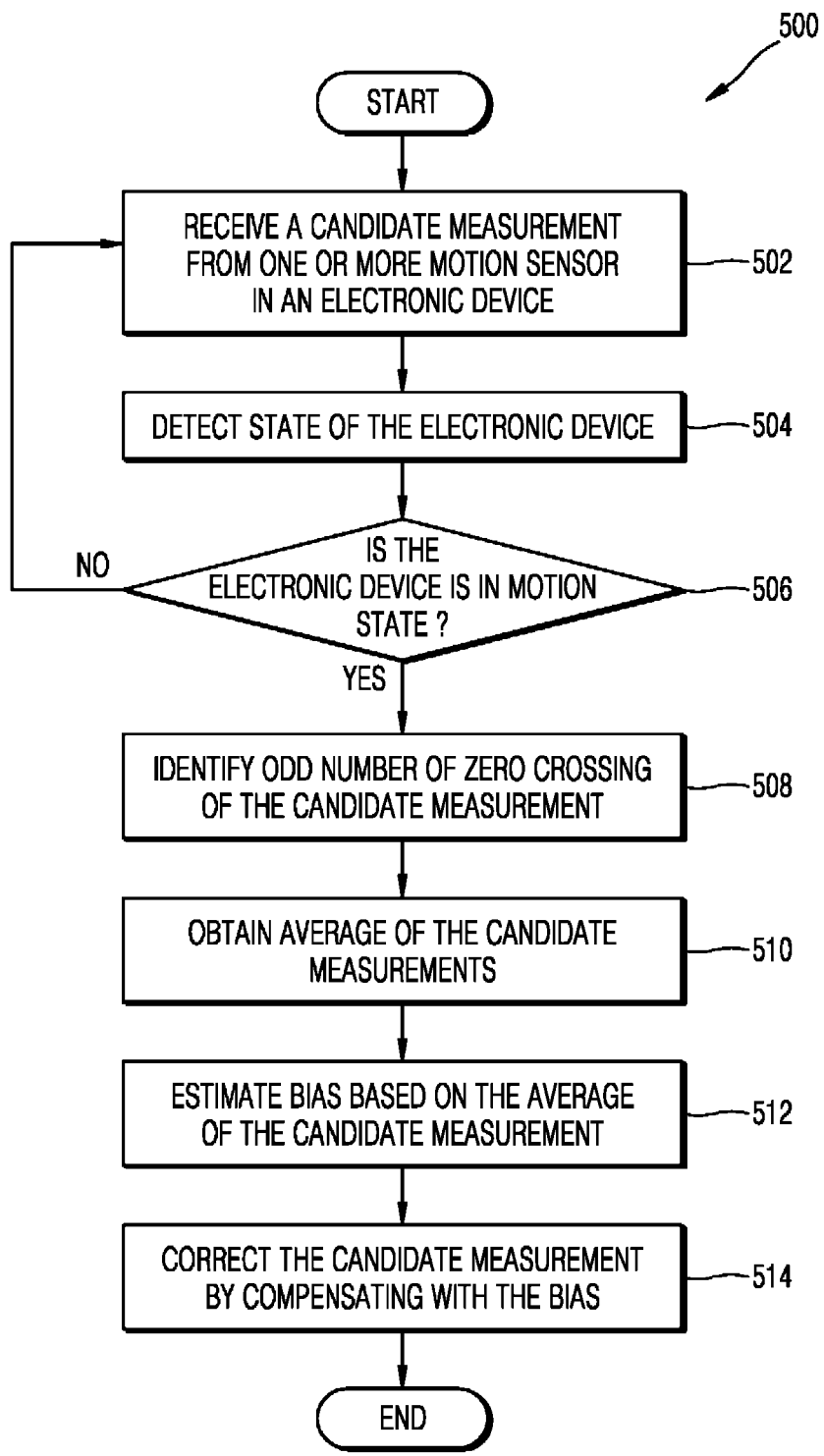
FIG. 5 is a flow chart illustrating another method of computing bias of a motion sensor unit, according to an exemplary embodiment as disclosed herein.

FIG. 5 is a flow chart illustrating another method 500 for computing bias of motion sensors, according to an exemplary embodiment as disclosed herein. In an exemplary embodiment, at step 502, the electronic device 100 receives a candidate measurement from at least one motion sensor. Here, the motion sensors may include MEMS sensors. The electronic device 100 allows the data processor 104 to receive the candidate measurement acquired by the at least one motion sensor. The candidate measurement includes values of the initial measurements obtained from the MEMS sensors. At step 504, the electronic device 100 detects the state of the electronic device 100. The electronic device 100 allows the data processor 104 to detect the state of the electronic device 100. In some exemplary embodiments, a state of the electronic device 100 means a motion state or static state. The state of the electronic device 100 may be detected in real time.

At step 506, the electronic device 100 determines whether the electronic device 100 is in the motion state. The electronic device 100 allows the data processor 104 to determine whether the electronic device 100 is in the motion state. If it is determined that the electronic device 100 is in the static state, the electronic device 100 repeats the step 502. The electronic device 100 allows the data processor 104 to repeat the step 502.

If it is determined that the electronic device 100 is in the motion state, at step 508, the electronic device 100 identifies the odd number of zero crossings of the candidate measurement. The electronic device 100 allows the data processor 104 to identify the odd number of zero crossings of the candidate measurement. For example, if the user of the electronic device 100 is walking, the data processor 104 detects the electronic device 100 in the motion state. In an exemplary embodiment, the motion of the electronic device 100 is a cyclic pattern which includes sinusoidal waves. The cyclic pattern is obtained as a result of walking impact of the user, measured by the MEMS sensors. From the cyclic pattern, the odd number of zero crossings of the X-axis is identified. The odd number of zero crossings (X-axis) arises due to the walking dynamics of the user.

At step 510, the electronic device 100 obtains average of the candidate measurements. The electronic device 100 allows the data processor 104 to obtain the average of the candidate measurements. The average of the candidate measurements from the MEMS sensors are obtained for determining the effective bias of the MEMS sensors. At step 512, the electronic device 100 estimates bias based on the average of the candidate measurements. The electronic device 100 allows the data processor 104 to estimate the bias based on the average of the candidate measurement. At step 514, the electronic device 100 corrects the candidate measurement by compensating with the estimated bias. The electronic device 100 allows the data processor 104 to correct the candidate measurement by compensating with the bias. Thus, with the proposed method 500, the low quality sensor measurements are corrected by compensating with the estimated bias for improving the measurements of the MEMS sensors.

The various actions, acts, blocks, steps, or the like in the method 500 may be performed in the order presented, in a different order or simultaneously. Further, in some exemplary embodiments, some of the actions, acts, blocks, steps, or the like may be omitted, added, modified, skipped, or the like without departing from the scope of the exemplary embodiments.

Figure 6:
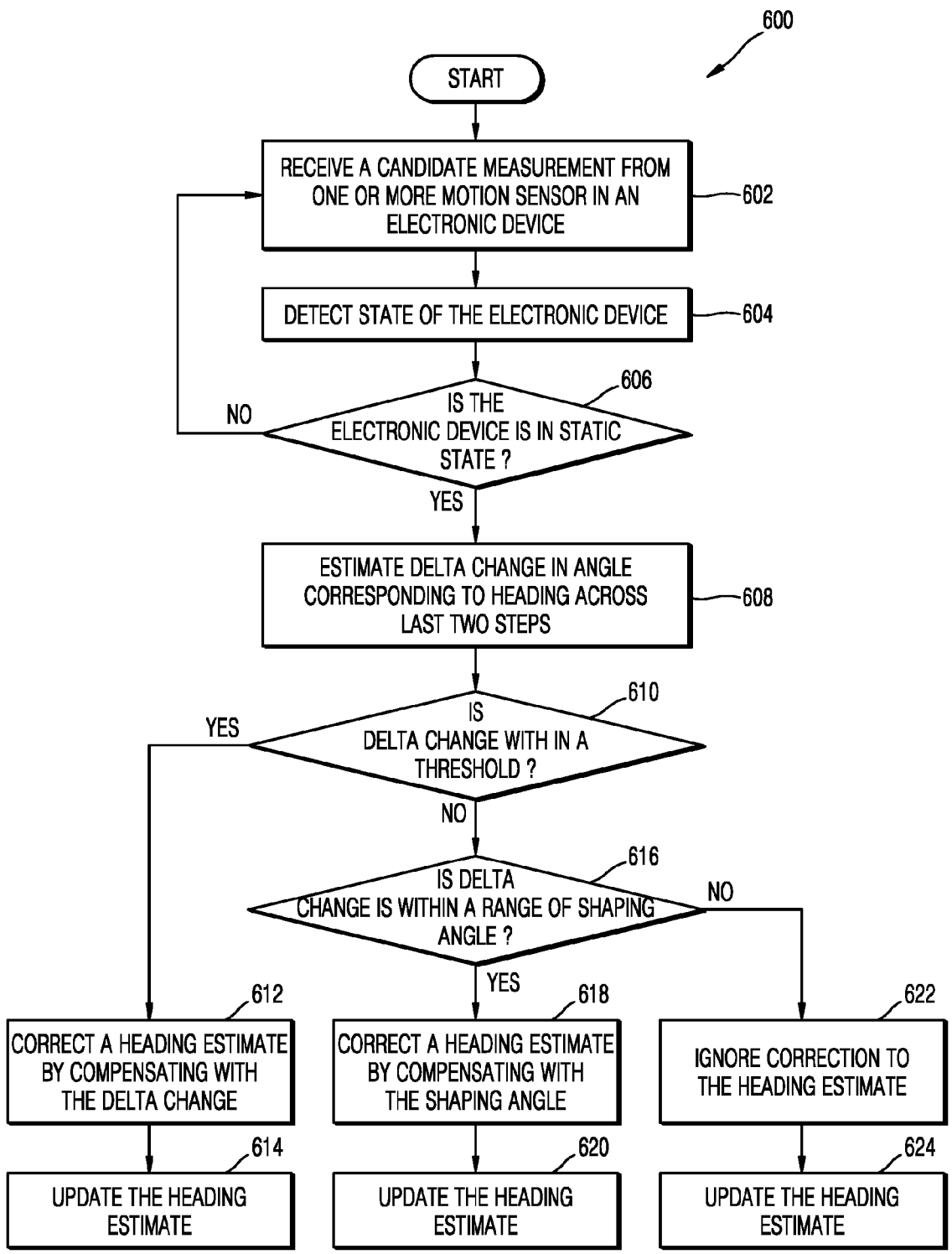
FIG. 6 is a flow chart illustrating a method of computing heuristic derived inferences of a motion sensor unit, according to an exemplary embodiment as disclosed herein.

FIG. 6 is a flow chart illustrating a method 600 for computing heuristic derived inferences of motion sensors, according to an exemplary embodiment as disclosed herein. In an exemplary embodiment, at step 602, the electronic device 100 receives a candidate measurement from at least one motion sensor. Here, the motion sensors may include MEMS sensors. The electronic device 100 allows the data processor 104 to receive the candidate measurement acquired by the MEMS sensors. The candidate measurement includes values of the initial measurements obtained from the MEMS sensors. The initial measurements are low quality measurements obtained from the MEMS sensors. At step 604, the electronic device 100 detects the state of the electronic device 100. The electronic device 100 allows the data processor 104 to detect the state of the electronic device 100.

At step 606, the electronic device 100 determines whether the electronic device 100 is in the motion state. The electronic device 100 allows the data processor 104 to determine whether the electronic device 100 is in the motion state. If the electronic device 100 is in the motion state then, at step 608, the electronic device 100 estimates a delta change in an angle corresponding to a heading across, for example, the user's last two steps. The electronic device 100 allows the data processor 104 to estimate the delta change in angle corresponding to heading across last two steps. In an exemplary embodiment, step occurrence time instant information from the pedometer, and the corresponding delta change in heading information is used for determining whether the user of the electronic device 100 is moving in a straight line or the user is taking turns while heading. It should be noted that the steps (for example, a minimum two steps) of the user (identified by the pedometer) along with the delta heading change can be used to determine whether the user is walking along a straight line or taking turns. The delta change in heading is estimated by considering the two step movements (steps) of the user.

At step 610, the electronic device 100 determines whether the estimated delta change in angle is within a threshold. The electronic device 100 allows the data processor 104 to determine whether the estimated delta change in angle is within the threshold. For example, if the estimated delta change in angle is 0.3 degrees and the threshold is 0.5 degrees then, the data processor 104 determines that the delta change is less than the threshold. If the estimated delta change in angle is less than the threshold then, it should be understood that the user is walking on a straight line path. When the estimated delta change in angle is less than the threshold, then the candidate measurements (from the MEMS sensors) are regarded as effects of bias. At step 612, the electronic device 100 corrects the heading estimate by compensating with the delta change. The electronic device 100 allows the data processor 104 to correct the heading estimate by compensating with the delta change. At step 614, the electronic device 100 updates the heading estimate. The electronic device 100 allows the data processor 104 to update the heading estimate. After correcting the heading estimate by compensating with the delta change, the heading estimate is updated.

If it is determined that the estimated delta change in angle is greater than the threshold at step 610 then at step 616, the electronic device 100 determines whether the delta change in angle is within a range of a shaping angle. The electronic device 100 allows the data processor 104 to determine whether the delta change in angle is within the range of the shaping angle. If it determined that the delta change in angle is within the range of the shaping angle at step 616 then, at step 618, the electronic device 100 corrects the heading estimate by compensating with the shaping angle. The electronic device 100 allows the data processor 104 to correct the heading estimate by compensating with the shaping angle. At step 620, the electronic device 100 updates the heading estimate. The electronic device 100 allows the data processor 104 to update the heading estimate. After correcting the heading estimate by compensating with the shaping angle, the heading estimate is updated.

If it is determined that that delta change in angle is beyond the range of the shaping angle at step 616 then, at step 622, the electronic device 100 ignores correction to the heading estimate. The electronic device 100 allows the data processor 104 to ignore correction to the heading estimate. At step 624, the electronic device 100 updates the heading estimate. The electronic device 100 allows the data processor 104 to update the heading estimate.

The various actions, acts, blocks, steps, or the like in the method 600 may be performed in the order presented, in a different order or simultaneously. Further, in some exemplary embodiments, some of the actions, acts, blocks, steps, or the like may be omitted, added, modified, skipped, or the like without departing from the scope of the exemplary embodiments.

Figure 7:
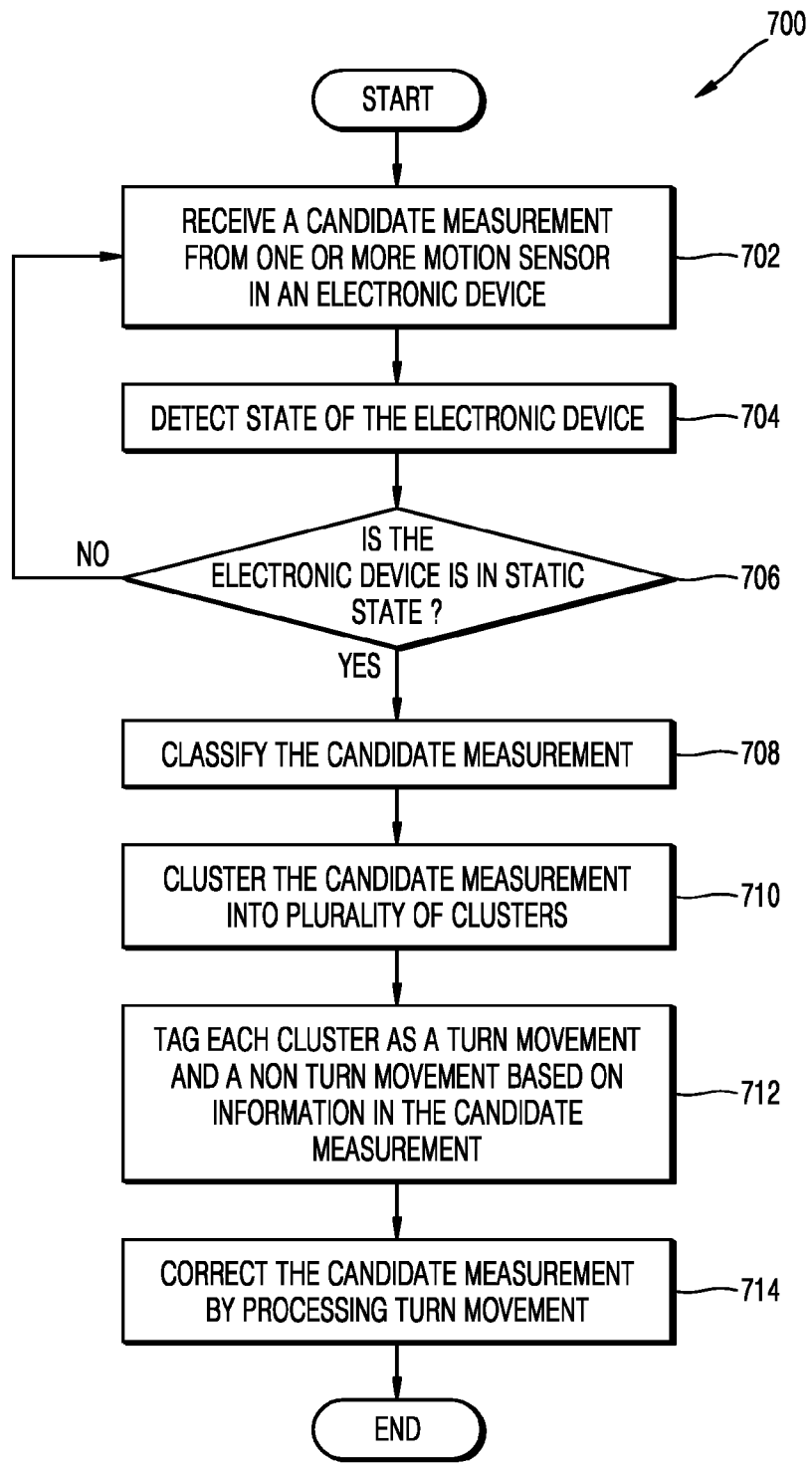
FIG. 7 is a flow chart illustrating a method of computing machine learning derived inferences of a motion sensor unit, according to an exemplary embodiment as disclosed herein.

FIG. 7 is a flow chart illustrating a method 700 for computing machine learning derived inferences of motion sensors, according to an exemplary embodiment as disclosed herein. In an exemplary embodiment, at step 702, the electronic device 100 receives a candidate measurement from at least one motion sensor. Here, the motion sensors may include MEMS sensors. The electronic device 100 allows the data processor 104 to receive the candidate measurement acquired by the MEMS sensors.

At step 704, the electronic device 100 detects the state of the electronic device 100. The electronic device 100 allows the data processor 104 to detect the state of the electronic device 100. The state of the electronic device 100 means a motion state or static state.

At step 706, the electronic device 100 determines whether the electronic device 100 is in the motion state. The electronic device 100 allows the data processor 104 to determine whether the electronic device 100 is in the motion state. If the electronic device 100 is in the motion state then, at step 708, the electronic device 100 classifies the candidate measurement. The electronic device 100 allows the data processor 104 to classify the candidate measurement. In an exemplary embodiment, an unsupervised approach may be applied to the candidate measurement for classification such as K means. In an example, K is equal to 2 for turn and non-turn directions.

At step 710, the electronic device 100 clusters the candidate measurement into the plurality of clusters. The electronic device 100 allows the data processor 104 to cluster the candidate measurement into the plurality of clusters. At step 712, the electronic device 100 tags each cluster as a turn movement and a non-turn movement based on information in the candidate measurement. The electronic device 100 allows the data processor 104 to tag each cluster as a turn movement and a non-turn movement based on information in the candidate measurement. In an exemplary embodiment, each cluster is tagged as turn movement and non-turn movement based on information in the candidate measurement.

At step 714, the electronic device 100 corrects the candidate measurement by processing turn movement. The electronic device 100 allows the data processor 104 to correct the candidate measurement by processing turn movement. In an exemplary embodiment, measurements of the MEMS sensors corresponding to the turn movement are processed for obtaining the corrected candidate measurement, thereby reducing the bias impact. Thus, the corrected candidate measurement is an improved measurement obtained from the low quality measurement of the MEMS sensors.

The various actions, acts, blocks, steps, or the like in the method 700 may be performed in the order presented, in a different order or simultaneously. Further, in some exemplary embodiments, some of the actions, acts, blocks, steps, or the like may be omitted, added, modified, skipped, or the like without departing from the scope of the exemplary embodiments.

Figure 8:
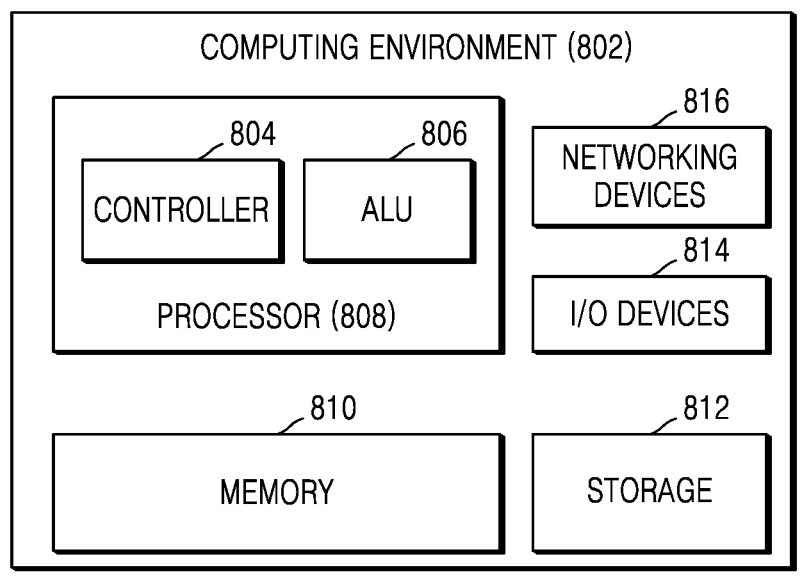
FIG. 8 is a block diagram showing a computing environment implementing the method of improving accuracy of measurements of a motion sensor unit, according to an exemplary embodiment disclosed herein.

FIG. 8 is a computing environment implementing the method of improving the measurements of motion sensors, according to an exemplary embodiment disclosed herein. As depicted in the FIG. 8, the computing environment 802 includes at least one processor 808 that is equipped with a controller 804 and an Arithmetic Logic Unit (ALU) 806, a memory 810, a storage 812, a plurality of networking devices 816 and a plurality Input/Output (I/O) devices 814. The controller 804 is responsible for processing the instructions of the algorithm. The processor 808 receives commands from the controller in order to perform its processing. Further, any logical and arithmetic operations involved in the execution of the instructions are computed with the help of the ALU 806.

The overall computing environment 802 can be composed of multiple homogeneous and/or heterogeneous cores, multiple CPUs of different kinds, special media and other accelerators. The processor 808 is responsible for processing the instructions of the algorithm. Further, the plurality of processors 808 may be located on a single chip or over multiple chips.

The algorithm including instructions and codes required for the implementation are stored in either the memory 810 or the storage 812 or both. At the time of execution, the instructions may be fetched from the corresponding memory 810 or storage 812, and executed by the processor 808.

In case of any hardware implementations various networking devices 816 or external I/O devices 814 may be connected to the computing environment to support the implementation through the networking devices and the I/O devices.

The exemplary embodiments disclosed herein can be implemented through at least one software program running on at least one hardware device and performing network management functions to control the elements. The elements shown in the FIGS. 1 and 8 include blocks which can be at least one of a hardware device, or a combination of hardware device and software module.

The foregoing description of the specific exemplary embodiments will so fully reveal the general nature of the exemplary embodiments herein that others can, by applying current knowledge, readily modify and adapt for various applications such specific exemplary embodiments without departing from the generic concept, and, therefore, such adaptations and modifications should and are intended to be comprehended within the meaning and range of equivalents of the disclosed exemplary embodiments. It is to be understood that the phraseology or terminology employed herein is for the purpose of description and not of limitation. Therefore, while the exemplary embodiments herein have been described using certain particular terms, those skilled in the art will recognize that the exemplary embodiments herein can be practiced with modification within the spirit and scope of the exemplary embodiments as described herein.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of improving accuracy of measurements of at least one motion sensor included in an electronic device, the method comprising:
   receiving a candidate measurement associated with the electronic device from the at least one motion sensor;
   detecting an electronic device state associated with the electronic device, wherein the electronic device state is one of a static state and a motion state;

computing a compensation parameter by estimating a bias based on the candidate measurement and the electronic device state; and correcting the candidate measurement based on the computed compensation parameter, wherein the computing the compensation parameter comprises:

estimating the bias when the electronic device state is detected as the static state, or computing orientation information from the candidate measurement received from the motion sensor when the electronic device state is detected as the motion state and estimating the bias based on the orientation information.

2. The method of claim 1, wherein the compensation parameter further includes at least one from among heuristic derived inferences, and machine learning derived inferences.

3. The method of claim 1, wherein the correcting the candidate measurement further comprises compensating the candidate measurement with the bias.

4. The method of claim 1, wherein the correcting the candidate measurement further comprises compensating the candidate measurement with the estimated bias.

5. The method of claim 1, wherein the computing the compensation parameter further comprises identifying an odd number of zero crossings of the candidate measurement, the zero crossings being generated when the electronic device state is detected as the motion state, and estimating the bias based on an average of the candidate measurement, and wherein the correcting the candidate measurement further comprises compensating the candidate measurement with the estimated bias.

6. The method of claim 1, wherein the computing the compensation parameter further comprises estimating a delta change in an angle corresponding to an estimate of a heading of the electronic device due to a user motion when the electronic device state is detected as the motion state.

7. The method of claim 6, wherein, if the delta change is below a threshold value, the candidate measurement is regarded as an effect of the bias and the estimate of the heading is corrected by compensating the heading estimate with the delta change.

8. The method of claim 6, wherein if the delta change is greater than a threshold value and below a shaping angle, the correcting the candidate measurement further comprises compensating the candidate measurement with the shaping angle.

9. The method of claim 1, wherein the computing the compensation parameter further comprises:

clustering the candidate measurement into a cluster from among a plurality of clusters; and tagging the cluster as corresponding to a turn movement or a non-turn movement based on information of the candidate measurement, wherein the compensation parameter is used to correct the candidate measurement if the cluster is tagged as corresponding to the turn movement.

10. A non-transitory computer readable recording medium storing computer executable program codes, which when executed by a processor, cause the processor to perform the method of claim 1.

11. An electronic device for improving accuracy of measurements of at least one motion sensor, the electronic device comprising:

a sensor configured to sense a candidate measurement associated with the electronic device through the at least one motion sensor; and a data processor configured to:

receive the candidate measurement associated with the electronic device from the at least one motion sensor;

detect an electronic device state associated with the electronic device, wherein the electronic device state is one of a static state and a motion state;

compute a compensation parameter based on the candidate measurement and the electronic device state; and correct the candidate measurement based on the computed compensation parameter.

12. The electronic device of claim 11, wherein the compensation parameter further includes one from among heuristic based inferences, and machine learning based inferences.

13. The electronic device of claim 12, wherein the data processor is configured to:

identify an odd number of zero crossings of the candidate measurement, the zero crossings being generated when the electronic device state is detected as the motion state;

estimate the bias based on an average of the candidate measurement; and correct the candidate measurement by compensating the candidate measurement with the estimated bias.

14. The electronic device of claim 12, wherein the data processor is configured to estimate a delta change in an angle corresponding to an estimate of a heading of the electronic device due to a human motion when the electronic device state is detected as the motion state.

15. The electronic device of claim 12, wherein the data processor is configured to:

cluster the candidate measurement into a cluster from among a plurality of clusters; and tag the cluster as corresponding to a turn movement or a non-turn movement based on information of the candidate measurement, wherein the compensation parameter is used to correct the candidate measurement if the cluster is tagged as corresponding to the turn movement.

16. A method for correcting a measurement made by a motion sensor included in an electronic device, the method comprising:

receiving a plurality of motion measurements associated with the electronic device from the at least one motion sensor, the plurality of motion measurements including a candidate motion measurement;

detecting a motion pattern associated with the plurality of motion measurements;

computing a compensation parameter by estimating a bias based on the detected motion pattern; and correcting the candidate motion measurement based on the computed compensation parameter, wherein the method further comprises estimating the bias when the electronic device state is detected as the static state, or computing orientation information from the candidate measurement received from the motion sensor when the electronic device state is detected as the motion state and estimating the bias based on the orientation information.

17. The method of claim 16, wherein the plurality of motion measurements are associated with a motion history of the electronic device, and wherein the candidate motion measurement is associated with a current motion of the electronic device.

18. The method of claim 17, wherein the motion pattern corresponds to at least one from among an orientation associated with the electronic device, a walking motion associated with a user of the electronic device, or an angle of a motion heading associated with the electronic device.

* * * * *